United States Patent [19]

Meshberg

[11] Patent Number: 4,696,415

[45] Date of Patent: Sep. 29, 1987

[54] APPARATUS FOR DISPENSING PRODUCTS FROM A SELF-SEALING DISPENSER

[76] Inventor: Philip Meshberg, 2500 S. Ocean Blvd., Palm Beach, Fla. 33480

[21] Appl. No.: 705,657

[22] Filed: Feb. 26, 1985

[51] Int. Cl.⁴ ........................ B65D 37/00; G01F 11/00

[52] U.S. Cl. ........................................ 222/82; 222/83; 222/207; 222/212; 222/383; 222/494

[58] Field of Search ........................ 222/80, 81, 82, 83, 222/89, 206, 207, 209, 212, 213, 215, 256, 259, 260, 321, 383, 386, 387, 491, 492, 494, 541, 340, 341

[56] References Cited

U.S. PATENT DOCUMENTS

| | | | |
|---|---|---|---|
| 3,162,333 | 12/1964 | Davidson | 222/207 |
| 3,249,268 | 5/1966 | Neuner | 222/494 |
| 3,754,690 | 8/1973 | Marchant | 222/494 |
| 3,964,641 | 6/1976 | Langensiepen et al. | 222/389 X |
| 4,154,371 | 5/1979 | Kolaczinski et al. | 222/212 |
| 4,301,948 | 11/1981 | Czech et al. | 222/341 |
| 4,394,939 | 7/1983 | Thor et al. | 222/212 X |
| 4,457,454 | 7/1984 | Meshberg | 222/209 X |
| 4,457,455 | 7/1984 | Meshberg | 222/105 |
| 4,485,943 | 12/1984 | Czech | 222/256 |
| 4,533,069 | 8/1985 | Drobish | 222/209 |
| 4,564,130 | 1/1986 | Eulenburg | 222/207 |

*Primary Examiner*—Joseph J. Rolla
*Assistant Examiner*—Kevin P. Shaver
*Attorney, Agent, or Firm*—Kenyon & Kenyon

[57] ABSTRACT

A vacuum pump dispenser has a primary compartment and a pumping compartment. The pumping compartment has an vacuum pump, having a flexible dome, movable to reduce the volume of the pumping compartment and dispense product therefrom, and a spout, having an opening through which product is dispensed, extending from the pumping compartment. The dispenser is self-sealing because the spout is sealed by a closure member having a sealing tip. The closure member is biased into a position where the tip closes the opening in the spout when the pumping compartment is in an unoperated position. The closure member is responsive to movement of the the flexible dome to move the tip out of the closed position to permit dispensing.

8 Claims, 10 Drawing Figures

APPARATUS FOR DISPENSING PRODUCTS FROM A SELF-SEALING DISPENSER

BACKGROUND OF THE INVENTION

1. Field of the Invention

This invention relates to a container with a self-closing orifice in general, and more particularly to a pump dispenser which forces product out of a self-sealing spout.

Various types of pump dispensers have been developed particularly for dispensing, e.g., viscous products. A vacuum pump uses the stroke of a mechanism, which increases the pressure on the product within a pumping compartment, to force product out of the container. The mechanism's return stroke creates a partial vacuum in the pumping compartment in the space previously occupied by the dispensed product and draws product from a primary compartment into the pumping compartment. The primary compartment may be a vented compartment coupled to the pumping compartment via a dip tube. It may also be a non-vented, variable volume compartment. In one such variable volume device, a second mechanism (often a piston), acted upon by atmospheric pressure, maintains the primary compartment's reduced volume. Alternatively, the reduced volume may be accomplished with a flexible, collapsible bag also acted upon by atmospheric pressure.

The instant application is related to an improved vacuum pump dispenser which seals the spout after dispensing a controlled dosage.

2. Description of the Prior Art

In U.S. Pat. No. 4,457,454, issued July 3, 1984, I disclose a two-compartment dispenser. In the two-compartment dispenser, fluent material is transferred from a collapsible primary compartment through a valve-controlled passage to a pumping secondary compartment. The product is dispensed from there through a discharge nozzle (spout). Alternate depression and release of a resiliently biased part of the pumping compartment's wall causes this pumping action.

Two problems arise in a vacuum pump dispenser (such as the two compartment dispenser of my prior U.S. Pat. No. 4,457,454)—controlling dosage and preventing contamination. First, the reduction in the pumping compartment's volume should be accurately gauged to dispense a predetermined amount of product (a controlled dosage). Second, the outlet port (or spout through which the product exits) should be sealed after each use to prevent exposure of the product to the atmosphere, thus preventing contamination of the remaining product and decreasing the possibility of caked product blocking the spout. Preventing contamination is especially important when the pump container holds a perishable food product.

My U.S. Pat. No. 4,457,454 shows several alternate mechanisms for sealing the spout. One embodiment shows a cap with slots that are manually twisted to align with slots in a nozzle for opening the nozzle and to misalign for closing the nozzle. Another embodiment shows a sliding cap within the nozzle. Pressure on the product within the dispenser forces the cap to slide outwardly exposing a spout located near the cap's tip. Manual effort, however, is required to push in the cap to seal the spout. While these seals are acceptable for most applications, e.g.: hand lotions and toothpaste, where the spout need not be closed after each use, a self-opening and self-sealing spout is a much-needed improvement for many applications, e.g.: perishable food products, where the spout should be closed between each use.

The prior art shows several mechanisms for sealing a spout. The most primitive prior art uses a removable cap to seal the outlet port. This, of course, is not a self-sealing spout because the user must replace the cap after each use. Additional inconvenience arises when the cap is lost or misplaced.

In U.S. Pat. No. 3,010,613, issued Nov. 28, 1961, Stossel shows a self-sealing spout having two overlapping plastic lips which open outwardly when product is pressed out of the dispenser and close to prevent the intake of air when pressure upon the product in the dispenser is released. U.S. Pat. No. 3,223,289, issued Dec. 14, 1965, shows a collapsible bag using the overlapping lips concept.

In U.S. Pat. No. 3,088,636, issued May 7, 1963, Spatz shows a dispenser with two different embodiments of self-sealing spouts. The first embodiment, having a spout with two overlapping lips, uses the concept disclosed in the '613 patent. The second embodiment shows a spout with an external valve head biased into the spout by a spring. An increase in pressure upon the fluid within the dispenser causes the head to be displaced outwardly, so that fluid can escape. Upon release of the pressure, the spring returns the head to the sealing position.

In U.S. Pat. No. 3,268,123, issued Aug. 23, 1966, Spatz shows another dispenser with a self-sealing spout using an internal head. A mechanism, which also increases the pressure on the product, moves the head inwardly away from the dispenser's spout to create a gap through which product exits the dispenser. When the mechanism is released, a spring urges the valve member outwardly to seal the spout.

SUMMARY OF THE INVENTION

The present invention accomplishes self sealing of a spout with a sealing member having a portion slidably mounted in the spout and biased such as to seal the spout when the dispenser is in an unoperated condition. The opening mechanism for creating a pressure differential to dispense the product is operatively coupled to the sealing member to open the spout during dispensing.

In one embodiment, the sealing member is a rod, extending into the spout, having a head to seal the spout and a channel, extending behind the head for a length greater than the width of the spout, to dispense the product. Preferably, the rod has a shoulder to control its advance so that the channel extends through the spout when the product is being dispensed. The rod also has a flexible extension attached to the opening mechanism and moveable therewith.

The sealing member may have another rod, pointed at one end, to pierce an internal seal in the container.

In these embodiments, no means are provided to seal the passage between the pumping compartment and primary compartment during dispensing. However, particularly for less viscous products, such sealing is helpful if not necessary. Therefore, in another type of self-sealing arrangement, the self-sealing mechanism also acts as a valve between compartments.

In one such embodiment, the spout is mounted to the pumping mechanism and moves therewith, and the sealing member is biased between the spout and a passage between a pumping compartment and a primary compartment. The sealing member includes a bent rod with a head on one end located in the spout, which acts as a seal for the spout, followed by a flat portion and a spring portion, and another head on the other end, which acts as a valve between the primary compartment and the pumping compartment.

In a further embodiment of this type, the spout is essentially fixed to the pump body, and the sealing member has two parts. The first part is a rod with a tip on one end extending horizontally into the spout. The second part is a stepped cylindrical plunger, coupled to the pumping mechanism and extending vertically through the rod, which bends the rod withdrawing the tip to open the spout and which blocks a passage to act as a valve between the primary compartment and the pumping compartment.

Finally, in an additional embodiment of this type, the sealing member also has two parts. The first part has an external head, which seals a spout affixed to the pump body, and a rod, which extends through the spout. The second part is a flexible member coupled to the internal end of the rod biasing the rod to close the spout. Pressure on product within the container displaces the head (and bends the flexible member) to open the spout. When pressure is released, the flexible member resumes its shape replacing the head to close the spout.

DETAILED DESCRIPTION OF THE PREFERRED EMBODIMENTS

Figure 1:
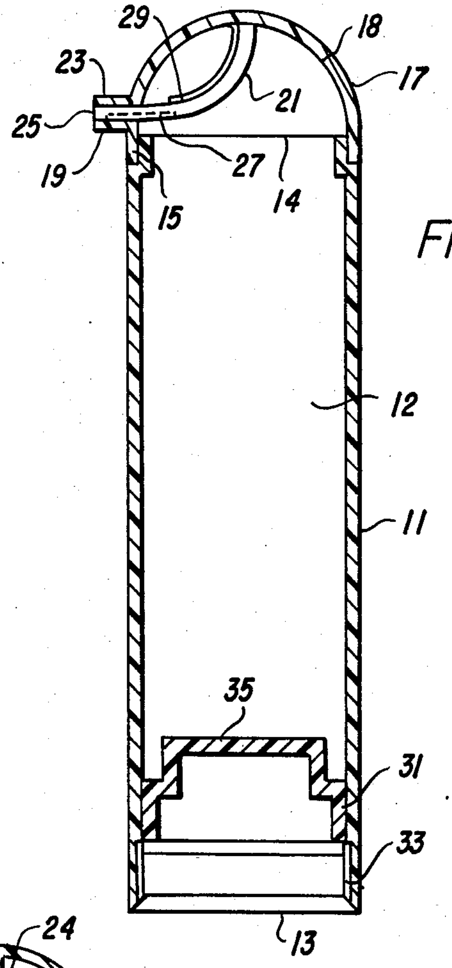
FIG. 1 is a cross-sectional view of a first embodiment of a dispenser, constructed in accordance with teachings of the present invention, using a piston compartment.

FIG. 1 illustrates a first embodiment of the present invention, using a vacuum pump dispenser with a moveable piston for reducing the volume of the primary product compartment. A rigid cylindrical container 11 defining the primary compartment 12 has one open end 13 (the bottom end) and another end 14 (the top end), with a section of reduced diameter 15. A generally hemispherical flexible cap 17 is attached to the top end of the container, e.g. by cementing or by friction fitting the cap 17 over the section of reduced diameter 15 at the top of the cylinder 11.

Figure 2:
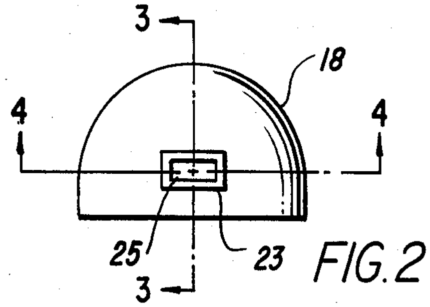
FIG. 2 is a perspective view showing the front of the top portion of the pumping compartment in FIG. 1.
Figure 3:
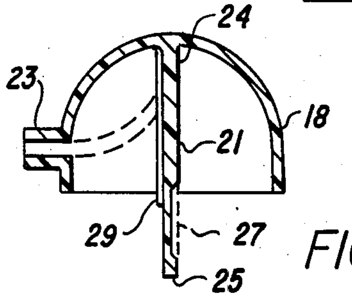
FIG. 3 is a cross-sectional view, taken along line 3—3 in FIG. 2, showing a side view of the top portion of the pumping compartment in an unassembled position.
Figure 4:
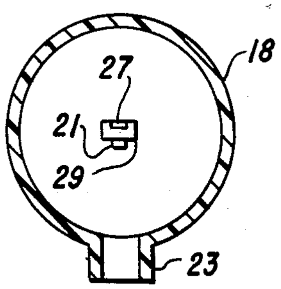
FIG. 4 is a cross-sectional view, taken along line 4—4 in FIG. 2, showing the top portion of the pumping compartment in the unassembled position.

The cap 17 has a hemispherical dome 18, a radially extending spout 19 on one side and a flexible sealing member 21 extending from the interior top of the dome. In the illustrated embodiment, the spout 19 is located near the lower edge of the dome 18 and has four walls 23 (See FIG. 2). As best seen in FIG. 3, member 21 is a flexible rod which has one end 24 fixed to the internal center of the dome 18, and has a free end with a tip 25 followed by a portion with a channel 27 in one side of the rod (See FIG. 4), and a shoulder 29 on the other side. The channel 27 is longer than the depth of the spout walls 23. The shoulder 29 is located so that the shoulder 29 will contact the spout wall 23 when the channel 27 extends through the spout 19. The entire cap 17, i.e., the dome 18, spout 19 and rod 21, is intergrally cast of the same resilient material, e.g., plastic. Before the cap 17 is attached onto the container 11, the tip 25 of the rod 21 is inserted into the spout 19 (See FIG. 1), so that the tip 25 closes the spout 19 by contacting the spout walls 23.

This embodiment is filled when turned upside down. After filling with product through opening 13, a piston 31 is inserted in the container's bottom opening 13 so as to eliminate any air space within the container 11. This is accomplished by using a vent 33 to release trapped air when the piston 31 is inserted.

To increase the efficiency of the pump, piston 31 is designed to resist movement in the downward direction. This is accomplished using any one of several methods known in the prior art, e.g.: radial spikes, a flexible lip or a pole and follower. The piston 31 is shaped to maximize the amount of product which is dispensed from the container 11. In this embodiment, the piston 31 has raised indentation 35 with a reduced diameter to fit into the reduced diameter portion 15 of the container 11.

The embodiment in FIGS. 1–4 operates as follows. When the dome 18 is depressed, rod 21 advances through the spout 19 until the rod's shoulder 29 touches the inside edge of the spout 19. The tip 25 pushes any caked product out of the spout 19. In this open position, the channel 27 creates an orifice extending through the spout 19. Product, under pressure from the reduced volume created by the dome's depression, exits the orifice in the spout 19.

When the cap 17 is released, the dome 18 returns to its original shape, retracting member 21 into the spout 19. In this closed position, the tip 25 closes off the spout by contacting the spout walls 23. The force, caused by the differential pressure from the product in the container 11 moving towards the space in the cap 17 which is returning to its original shape, causes the piston 31 to advance upward, reducing the volume of the container 11.

Thus, a predetermined amount of product is dispensed because a predetermined depression of the cap 17 results from the rod's shoulder 29 contacting the spout walls 23. The seal caused by the rod's tip 25 contacting the interior of the spout walls 23 prevents the atmosphere from contaminating the product in the container 11.

While this is a simple embodiment, it is not suitable for mass-production because the tip 25 must be inserted in the spout 19 and the cap 17 must be attached to the cylinder 11 before filling the dispenser with product from the bottom. A second embodiment (FIG. 5) has a mechanism for breaking an internal seal so that the container can be filled with product before the cap is attached.

In this alternate embodiment (FIG. 5), the flexible member 21′ has two rods 37 and 39. The first rod 37, shaped much like that of the previous embodiment, has a tip 41, followed by a channel 43 on one side and a shoulder 45 on the other side. The second rod 39 is located away from the spout 19 in the same plane as the rod 37. The second rod 39 comes to a point 47 which is used to pierce an internal seal 16 to open the dispenser.

Figure 5:
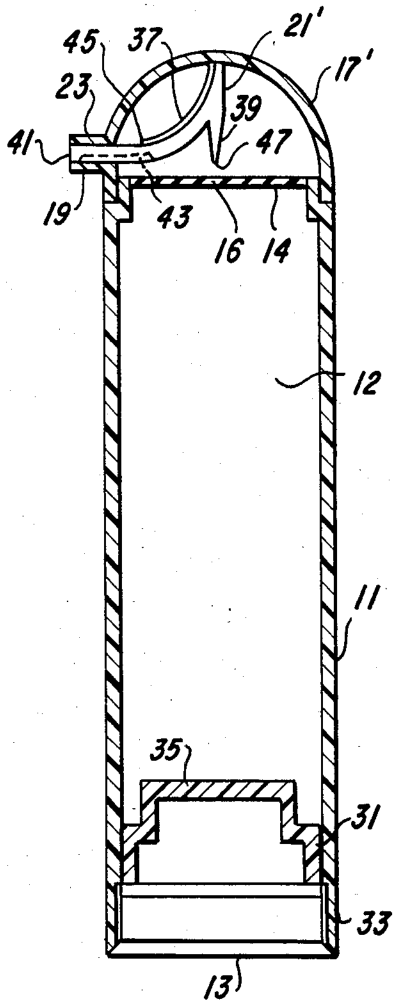
FIG. 5 is a cross-sectional view of a second embodiment of a two-compartment dispenser, constructed in accordance with teachings of the present invention, using a piston compartment.

The embodiment in FIG. 5 is filled much like the embodiment in FIGS. 1-4. After a seal 16 is attached to the container's upper end 14, the container 11 is inverted and filled with product. A piston 31 is then inserted in the open end 13. The cap 17′ is then attached to the sealed end 14.

The embodiment in FIG. 5 operates similarly to that in FIGS. 1-4. On first use, the depression of cap 17′ forces point 47 through seal 16 and extends tip 41 through the spout 19 so that channel 43 is an orifice extending through the spout 19. After priming the pump, i.e., filling the pump compartment with product by pressing on the piston 31, for example, the embodiment operates as that in FIGS. 1-4.

These above-described embodiments do not have a mechanism for preventing air from entering the spout while the cap is being released. Thus, they rely on the viscosity of the product and its adhesion to the spout walls to prevent the entry of air from thwarting the pumping process. These embodiments, therefore, should not be used with less-viscous products. Also, since there is no internal valve means, they should not be used with a flexible bag, for example, as the primary compartment unless the product is viscous enough that the product exits the spout when pressure is applied rather than moving the bag wall. However, refer to my U.S. Pat. No. 4,457,454 for several mechanisms which prevent the backflow of product into the primary compartment. Using any one of these mechanisms, these embodiments may also use a flexible bag as the primary compartment.

Figure 6:
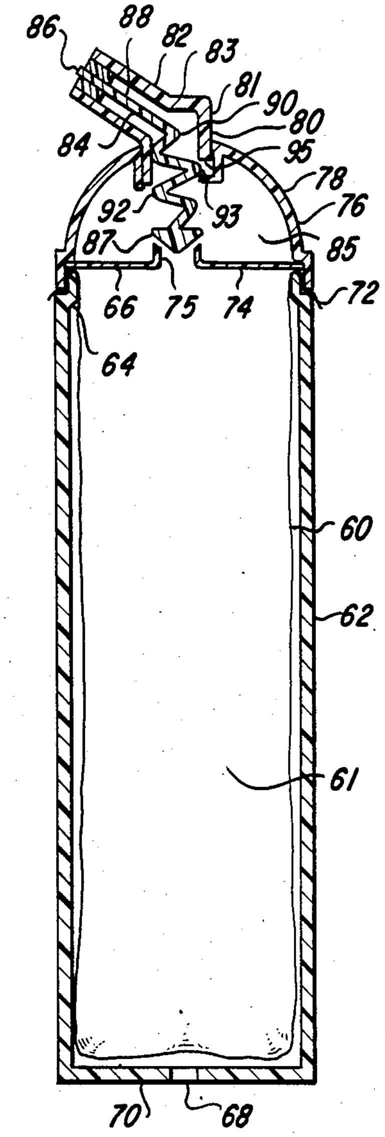
FIG. 6 is a cross-sectional view of a third embodiment, using a two-compartment dispenser with a collapsible bag.

My U.S. Pat. No. 4,457,454 shows a two-compartment dispenser where the primary compartment is a collapsible bag. The embodiment of FIG. 6 is an improvement upon the embodiments in the '454 patent. Reference therefore is made to the disclosure in that patent, which is hereby incorporated by reference.

FIG. 6 shows an embodiment of the present invention using a flexible bag. Bag 60 is filled with product and inserted into cylindrical container 62, which has a section of reduced diameter 64 at an opening in the upper end 66 and a vent hole 68 on the lower end 70. Bag 60 which forms the primary compartment 61 has a lip 72 which extends over the section of reduced diameter 64. A disk-shaped divider 74 with a center hole 75 is attached over the open end 66 of cylinder 62 and bag 60, either as a part of bag 60 or as a separate insert. A hemispherical shaped cap 76 is fitted over the divider 74 and attached to the section of reduced diameter 64 by any one of several known methods.

The cap 76 has a flexible hemispherical dome 78 and a rigid spout 80 extending axially from the dome's center. The cap 76 may be integrally cast of flexible material. Alternately, a rigid spout 80 may be assembled onto a flexible dome 78 (as shown in FIG. 6).

The spout 80 comprises a cylindrical tube 81 aligned with the container's axis and a rectangular tube 82 radially projecting from a point 83 on the top of the cylindrical tube 81.

A resilient sealing member 84 is positioned in the pumping compartment 85 between the cap 76 and the divider 74. The member 84 has a rectangular wedge tip 86 biased into the spout's rectangular portion 82, and a conical wedge tip 87 spaced from the hole 75 in the divider 74. A flat rectangular rod 88 extends behind the rectangular tip 86 for the length of the rectangular tube 82. From the rod's end 90, a vertical spring section 92 leads to the conical tip 87. This biases tip 86 into sealing contact but maintains wedge 87 spaced from hole 75. A stop 95 may be provided, against which elbow 93 of spring section 92 can rest. Member 84 may be made of molded plastic.

Figure 7:
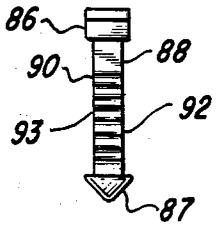
FIG. 7 is an exploded view of the sealing member in FIG. 6.

The embodiment in FIGS. 6 and 7 operates in a manner similar to the embodiments in FIGS. 1-4 and 5. Cap 76 is depressed, causing rod 88 to advance until shoulder 90 contacts the spout wall 83 so tip 86 is outside spout 80 creating an opening through the spout 80. With the initial actuation, wedge 87 moves to seal hole 75. After product is dispensed, cap 76 is released, causing tip 86 to retract into spout 80 and wedge 87 to unseat from hole 75. Some of the product in the flexible bag 60 is pulled into the pumping compartment through hole 75 past tip 87 by the vacuum caused by dome 78 returning to its original shape.

Since, in operation, the conical wedge 87 prevents a pressure increase in the pumping compartment 85 from dissipating by expanding the primary compartment 61, this embodiment is useful for a wide range of fluids using either the flexible bag 60, a piston compartment or a vented container fed through a dip tube as the primary compartment. Additionally, the primary compartment may be filled with product and stored before attaching the pump cap 76. In this embodiment, the pumping compartment must be primed before first use either by applying suction to the spout 80 or by pressing the bag 60.

Figure 8:
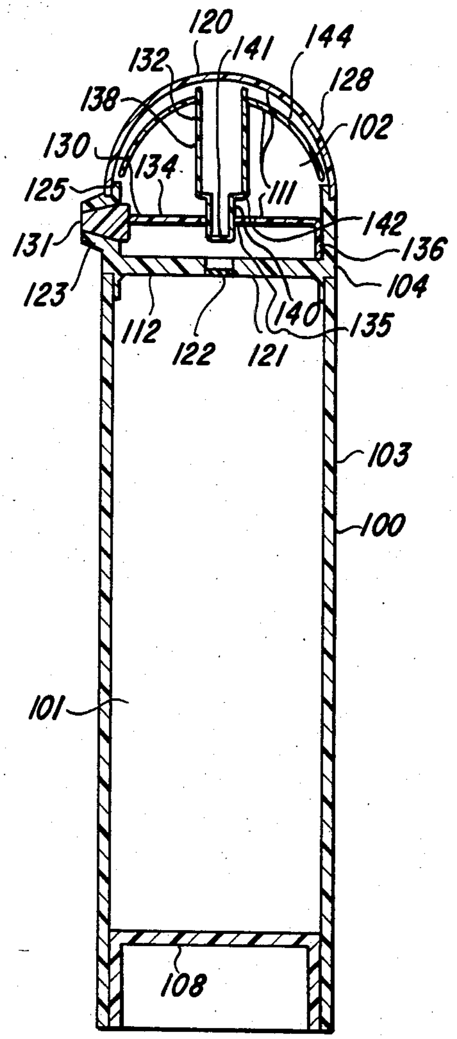
FIG. 8 is a cross-sectional view of a fourth embodiment, using a two-compartment dispenser with a piston compartment.

FIG. 8 shows a self-priming embodiment. This embodiment uses a movable piston in the primary compartment, although the design can also use a flexible bag or vented container. This embodiment may be adapted to pump products having a wide range of viscosities by selecting the materials for the various parts of the pump.

In the embodiment in FIG. 8, the container 100 has a primary compartment 101 and a pump compartment 102.

The primary compartment 101 is formed by a rigid cylinder 103 with a pump base 104 attached to one end, and, after filling with product, a movable piston 108 in the other end. Before a first operation, pump base 104 seals the end of compartment 101. Since primary compartment 101 is sealed, a product may be stored in it for a considerable period before a pump head 111 is attached.

The pump base 104 is a short cylinder mounted on top of the primary compartment 101. The bottom end 112 of the base 104 is a disk portion 121 with a thin detachable section 122 in its center. The base 104 also has formed therein a tapered spout 123 radially extending from the short cylinder. The upper end of the cylinder is a thin rim 125. The pump base 104 may be cast separately from the cylinder 103 and attached thereto, or the two parts may be integrally cast of the same rigid material. Indeed, the reuseable pump base 104 can be snapped onto a disposable primary compartments 101.

The pumping compartment 102 is defined by the interior of the pump base 104 and a flexible dome 128. Within the pumping compartment 102 is a sealing member 130 and a valve member 132. While the dome 128, sealing member 130 and valve member 132 are all preferably made of plastic, each should be made of a material chosen for its particular spring effect. This selection of materials permits creating an optimum pump head 111 for a particular product.

The sealing member 130 has a wedge tip 131 on one end. The tip 131 is followed by a rod 134 which has a hole 135 larger than the detachable portion 122 of the base 104 and positioned so that it is aligned with detachable portion 122 when assembled. Finally, the rod's other end is bent to form a vertical support 136, which has a length approximately the length from the disk 121 to the center of the spout 123.

The valve member 132 has a vertical cylindrical plunger 138 with a portion 140 of reduce diameter slightly smaller than the divider's detachable portion 122. The reduced diameter portion 140 is slightly longer than the sealing member's vertical support 136, so that the end 141 of the reduced diameter portion extends through the disk 121 before a flange 142 (where the plunger's diameter becomes greater than the diameter of hole 135 through the sealing member 130) contacts the sealing member. Finally, spring arms 144 extend from the plunger's upper end to form a hemispherical cage large enough to contact rim 125.

The pump head 111 is assembled onto the primary compartment 101 by inserting the sealing member's tip 131 into the spout 123, putting the valve member 132 onto the rim 125 and attaching the dome 128 over the rim 125.

The embodiment in FIG. 8 operates in a manner similar to the other embodiments. The user depresses cap 120, causing plunger 140 to block hole 122 (the initial use removes the detachable portion 122 and primes the pump). Further depression of the cap 120 bends rod 134 because the flange 142 contacts rod 134 around hole 135. Bending the rod 134 causes tip 132 to slide inwardly along the spout wall creating an opening through the spout 126. Continued depression on the cap 120 exerts pressure through the dome 128 to force product from the pumping compartment 102 through the spout 126.

Upon the user releasing the cap 120, arms 144 lift plunger 132 expanding the dome 128 and straightening the rod 134. Initially, some residual product (or air) in the spout is drawn into the pumping compartment 102 through the spout 123 to prevent dribbling. But, the tip 131 seals the spout 123 before a substantial amount of air is sucked into the pumping compartment 102 because the rod is substantially straightened before the dome 128 expands significantly. As the arms 144 continue to lift the plunger 132, the plunger's tip 141 no longer blocks the hole 122 in the divider 121, so product is drawn from the primary compartment 101 into the pumping compartment 102. The piston 108 simultaneously advances to reduce the volume of the primary compartment 101. .

Thus, a predetermined amount of product is dispensed because plunger 132 is only depressed the length of its reduced portion 140. The spout is self-sealing without dribbling because the tip 131 automatically returns to the spout 123.

This embodiment does not require priming before first use because, upon releasing the dome 128, the tip 131 seals the spout 123 before the dome 128 resumes its hemispherical shape, so the pump does not require fluid friction (caused by the product adhering to the inside of the spout 123) to prevent air from entering the pumping compartment 102. Thus, this easily assembled embodiment is capable of having a long shelf life because the primary compartment 101 is sealed until the consumer's first use.

Figure 9:
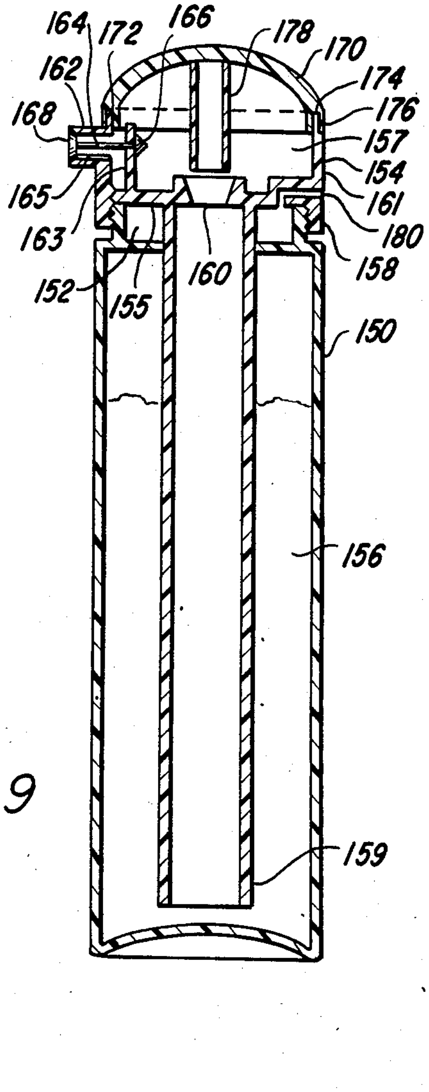
FIG. 9 is a cross-sectional view of a fifth embodiment of a vacuum pump dispenser in which a vented bottle forms the primary compartment.

FIG. 9 shows another embodiment. This embodiment is illustrated with a vented bottle as the primary compartment. Of course, a collapsible bag as in FIG. 6 or a piston and cylinder as in FIG. 8 may also be used in this pump dispenser.

In this embodiment, a bottle 150 is filled with product through its open end 152. A cap 154, forming a divider 155 between a primary compartment 156 and a pumping compartment 157 is screwed onto the open end 152 using screw threads 158. A dip tube 159 extends into the product from an opening 160 in divider 155.

Cap 154, which forms the base of pumping compartment 157, has a short cylinder 161 with a radially extending spout 162, and an internal upstanding flexible member 163 containing a slot. A channel 165 is formed in the base of spout 162. A spout closure 164 is inserted into the spout 162 by passing a fastner pin 166 through the slot in flexible member 163 so that a closure tip 168 seals the spout 162. A flexible dome 170 is attached to the top 172 of the cylinder 154 by friction fitting an inner flange 174 and an outer flange 176 over the cylinder's top edge 172. A plunger 178, with an outer diameter approximately equal to the smallest diameter of the passage 160, extends downwardly from the dome's center to a position directly above the passage 160. A vent 180 in the cap 154 allows air to enter the bottle 150 but does not allow air to escape.

The embodiment in FIG. 9 operates much like the other embodiments. Manual pressure on the dome 170 causes the plunger 178 to descend, blocking the passage 160. Continued depression increases the pressure in the pumping compartment 157 (bending the flexible member 163) until the fluid escapes out the spout 162 guided by channel 165 past the tip 168 of the closure 164. Once product has escaped to lower the pressure, member 163 returns to its original shape, retracting closure 164 through the spout until tip 168 seals the spout 162. Release of the dome 170 allows it to resume its shape sucking fluid up the dip tube 159 past the passage 160, which has been opened by the rise of the plunger 178. Air enters the vent 180 to stabilize the pressure in the bottle 150 with less product in it.

This embodiment, therefore, dispenses a controlled dosage, because plunger 178 limits the dome's movement. The spout is self-sealing because member 163 returns the tip 168 to block the spout 162.

This embodiment need not be primed because the closure tip 168 acts as a valve to seal the spout 162 while the dome 170 is depressed, so the change in volume created by the dome's expansion lifts the fluid up the dip tube 159.

Figure 10:
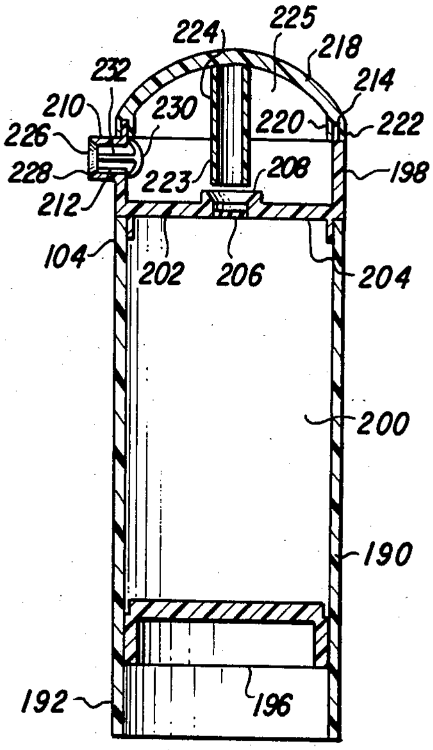
FIG. 10 is a cross-sectional view of a sixth embodiment of a vacuum pump dispenser in which a piston chamber forms the primary compartment.

FIG. 10 shows another embodiment. This embodiment is illustrated with a piston chamber as a primary compartment (although a collapsible bag or a vented bottle may also be used).

In this embodiment, a cylinder 190 has two open ends 192, 194. A piston 196 is inserted in one end 192 and a cap 198 is inserted in the other end 194 (after filling the cylinder 190 with product). The cylinder 190, piston 196 and cap 198 define the primary compartment 200.

The cap 198 is a short cylinder mounted on top of the primary compartment 200. The bottom end 202 of the cap 198 is a disk portion 204 with a thin detachable section 206 in its center. The disk has a tapered flange 208 leading to the detachable section 206. The cap 198 also has formed therein a spout 210 radially extending from the short cylinder. The spout 210 has a channel 212 cut therethrough to guide product from the spout. The upper end of the cylinder is a thin rim 214. The cap 198 may_be cast separately from the cylinder 190, or the two parts may be integrally cast of the same rigid material.

A flexible dome 218 is attached to the top 214 of the cap 198 by friction fitting an inner flange 220 and an outer flange 222 over the cap's top edge 214. A plunger 224, with an outer diameter approximately equal to the diameter of the breakable section 206, extends downwardly from the dome's center to a position directly above the breakable section 206. A ridge 223 radially extends from the plunger 224 at a position where the pump will dispense the desired dosage when the ridge 223 contacts the flange 208.

The cap 198 and dome 218 form the pumping compartment 225.

A flexible sealing member 226 is inserted into the spout 210 so that the member's tapered tip 228 fits snugly into the spout 210. The member has flexible fingers 230 which bias the tip 228 in the spout by extending a thin rod 232 through the spout.

The embodiment in FIG. 10 operates like the other embodiments. The user depresses dome 218, which initially removes section 206 by pushing plunger 224 through the passage defined within tapered flange 208. This first use also primes the pumping compartment 225 by expelling air out the spout 210.

Product is dispensed by depressing the dome. Initially, plunger 224 blocks the passage between the flange 208, creating an increase in pressure on the product in the pumping compartment 225. This pressure exerted on tip 228 causes the sealing member fingers 230 to bend, displacing the tip 228 from the spout 210. Product, flowing down the channel 212 and past the tip 228, exits the spout 210.

When the pressure in the pumping compartment 225 is substantially reduced (as when the dome 218 is released), the fingers 230 retract the rod 232 into the spout 210, thus repositioning the tip 228 into the spout 210. Release of the dome 218 allows it to resume its shape, retracting the plunger 224 from the tapered flange 208. Product flows from the primary compartment 200 through the opening defined within the flange 208 into the pumping compartment 225 to equalize the pressure in the container. The piston 196 is drawn up to reduce the primary compartment's volume.

This embodiment, therefore, dispenses a controlled dosage because the ridge 223 on plunger 224 limits the dome's movement. The spout 210 is self-sealing because fingers 230 return the sealing member's tip 228 into the spout 210.

What is claimed is:

1. A vacuum pump for a dispenser having a primary compartment containing product to be dispensed comprising:

(a) means for defining a pumping compartment including a rigid base, generally cylindrical sidewall portion and movable means to reduce the volume of said compartment and dispense product therefrom;

(b) a spout, extending radially from said sidewall portion, comprising a channel cut therethrough, an inner opening communicating with one end of the channel and the pumping compartment, and an outer opening, through which product is dispensed, communicating with the other end of the channel and the ambient environment;

(c) a unitary self-sealing closure member mounted in the spout having a sealing tip for closing said outer opening in said spout;

(d) means biasing said member into a position where said tip abuts the other end of the channel thereby closing said outer opening in said spout when said pumping compartment is in an unoperated position;

(e) said closure member responsive to movement of said pumping compartment movable means to move said tip out of said closed position;

(f) means for deterring backflow from said pumping compartment and dispensing a controlled dosage of product including a tapered flange terminating in an aperture in said rigid base and a valve element coupled to said movable means wherein said base separates the pump compartment from a primary compartment containing product to be dispensed;

(g) said valve element comprises a plunger for opening and closing said aperture during operation;

(h) said plunger includes stop means located at a predetermined intermediate position along the plunger for dispensing a predetermined dosage of product from the spout when the stop means contacts the tapered flange; and (i) said aperture in said rigid base comprises a thin detachable section which breaks away from said base to form said aperture upon initial operation of said plunger.

2. A vacuum pump dispenser comprising:

(a) a primary compartment for containing product to be dispensed;

(b) means defining a pumping compartment including a rigid base, a generally cylindrical sidewall portion and movable means to reduce the volume of said compartment and dispense product therefrom;

(c) a spout, extending radially from said sidewall portion, comprising a channel cut therethrough, an inner opening communicating with one end of the channel and the pumping compartment, and an outer opening, through which product is dispensed, communicating with the other end of the channel and the ambient environment;

(d) a unitary self-sealing closure member mounted in the spout having a sealing tip for closing said outer opening in said spout;

(e) means biasing said closure member into a position where said tip abuts the other end of the channel thereby closing said outer opening in said spout when said pumping compartment is in an unoperated position;

(f) said closure member responsive to movement of said pumping compartment movable means to move said tip out of said closed position;

(g) means for deterring backflow from said pumping compartment and dispensing a controlled dosage of product including a tapered flange terminating in an aperture in said rigid base and a valve element coupled to said movable means wherein said base separates the pump compartment from a primary compartment containing product to be dispensed;

(h) said valve element comprises a plunger for opening and closing said aperture during operation;

(i) said plunger includes stop means located at a predetermined intermediate position along the plunger for dispensing a predetermined dosage of product from the spout when the stop means contacts the tapered flange; and (j) said aperture in said rigid base comprises a thin detachable section which breaks away from said base to form said aperture upon initial operation of said plunger.

3. A vacuum pump according to claims 1 or 2 wherein said stop means comprises a radially extending ridge.

4. Apparatus as defined in claim 1 or 2 wherein said aperture and said detachable section are circular in cross-section.

5. A vacuum pump as defined in claim 1 wherein said movable means comprises flexible means including a flexible dome attached over said base.

6. Apparatus as defined in claim 2 wherein said movable means comprises flexible means including a flexible dome attached over said base.

7. A vacuum pump according to claims 5 or 6, wherein the biasing means comprises a portion of the closure member extending from the tip through the spout to an interior portion of the pumping compartment, said portion including flexible fingers configured to bow outwardly away from the inner opening to bias the sealing tip closed in a completely self-sealing manner obviating additional biasing or sealing means for the outer opening.

8. Apparatus as defined in claim 2, wherein:

the means defining a pumping compartment is detachable from the primary compartment; and the primary compartment is disposable.

* * * * *